US006152374A

United States Patent [19]

Moriyama et al.

[11] Patent Number: 6,152,374

[45] Date of Patent: Nov. 28, 2000

[54] METHOD FOR RENTING FABRIC ARTICLES AND DATA CODE-PRINTED SHEET

[75] Inventors: Junichi Moriyama; Toshimitsu Tachibana; Katsuya Kume; Hidetoshi Itou, all of Osaka, Japan

[73] Assignee: Nitto Denko Corporation, Osaka, Japan

[21] Appl. No.: 09/131,674

[22] Filed: Aug. 10, 1998

[30] Foreign Application Priority Data

Aug. 8, 1997 [JP] Japan .................................... 9-227302

[51] Int. Cl.[7] ................................................ G06K 19/06

[52] U.S. Cl. .......................... 235/494; 235/487; 428/221

[58] Field of Search .................................... 235/494, 385, 235/492, 487; 428/42.1, 187, 221

[56] References Cited

U.S. PATENT DOCUMENTS

| | | | |
|---|---|---|---|
| Re. 33,054 | 9/1989 | Markman | 235/385 |
| 3,729,332 | 4/1973 | Grubb et al. | 428/42 |
| 4,766,301 | 8/1988 | Evers | 235/487 |
| 4,981,742 | 1/1991 | Haigh | 428/64 |
| 5,241,163 | 8/1993 | Vachtsevanos et al. | 235/449 |
| 5,480,700 | 1/1996 | Kume et al. | 428/207 |
| 5,658,647 | 8/1997 | Magill et al. | 428/195 |
| 5,962,834 | 10/1999 | Markman | 235/385 |
| 5,964,354 | 10/1999 | Skinner | 209/3.3 |
| 5,998,005 | 12/1999 | Kanno | 428/221 |

FOREIGN PATENT DOCUMENTS

| | | |
|---|---|---|
| 7-47633 | 2/1995 | Japan . |
| 9-39141 | 2/1997 | Japan . |

*Primary Examiner*—Donald Hajec
*Assistant Examiner*—Daniel St. Cyr
*Attorney, Agent, or Firm*—Sughrue, Mion, Zinn Macpeak & Seas, PLLC

[57] ABSTRACT

A method of renting fabric articles comprising sticking a bar code-printed sheet onto the fabric articles and repeatedly renting and washing the fabric articles under the management with the use of the bar codes, by which the bar codes can be read even after washing the fabric articles 100 times and thus the rental business can be smoothly performed. The method of renting fabric articles comprises sticking a data code-printed sheet onto the fabric articles and repeatedly renting and washing the fabric articles under the management with the use of the data codes, characterized in that the data code-printed sheets are those wherein the data code (2) is printed on an ink-receiver layer (1) which is a porous layer made of an ultra-high-molecular-weight polyethylene having a viscosity-average molecular weight of from 500,000 to 10,000,000 and having an average surface roughness Ra of 5 $\mu$m or less and a degree of shrinkage under contact with air or in an aqueous alkali solution of pH 10 to 11 of 5% or less.

4 Claims, 1 Drawing Sheet

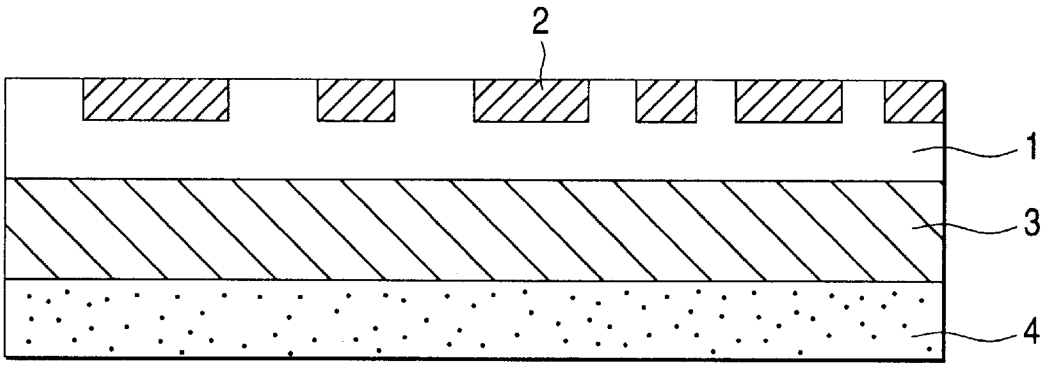
2
1
3
4

METHOD FOR RENTING FABRIC ARTICLES AND DATA CODE-PRINTED SHEET

FIELD OF THE INVENTION

The present invention relates to a method for renting and supplying fabric articles, for example, uniforms such as work clothes.

BACKGROUND OF THE INVENTION

Rental fabric articles, for example, uniforms such as work clothes are cleaned every time they are returned and then rented again to supply. It is well known that the bar code system has been widely employed in the management of various items for sale. Thus, it is expected that the bar code system might be also applicable to the management of the rental clothes as described above.

A bar code-printed sheet in which bar code is heat transfer-printed on an ink-receiver layer which is a porous layer made of an ultra-high-molecular-weight polyethylene having a viscosity-average molecular weight of 300,000 to 10,000,000 and having an average pore size of 100 $\mu$m or less is proposed in JP-A-9-39141 (the term "JP-A" as used herein means an unexamined published Japanese patent application).

This bar code-printed sheet has a number of advantages as follows: (a) Since the ultra-high-molecular-weight polyethylene per se has a high resistance to abrasion and has been impregnated with the ink held in the pores, the bar code-printed sheet has a remarkably high resistance to abrasion and thus withstands frequent wipe-off contacts encountering during transportation without resorting to over-coating. (b) Since the ink-receiver layer has a low heat conductivity, the heat energy required in the heat transfer printing is reduced and the heat amount accumulated in the heat transfer head is lowered, thus facilitating the heat transfer printing.

Accordingly, the present inventors have attempted to apply the bar code-printed sheet disclosed in the above JP-A-9-39141 to the management of rental fabric articles such as uniforms.

This bar code-printed sheet has a high resistance to abrasion so that the bar code can be read at a ratio of 100% even after rubbing with cloth moistened with artificial sweat. It is expected, in particular, that the resistance to abrasion would be elevated with a decrease in the surface roughness Ra. This is because a bar code-printed sheet having a lower surface roughness has the larger ink-contact area per unit area and thus the penetration of the ink into the porous layer is promoted and heat can be more uniformly transferred thereto from the heat transfer printing head, thus elevating the bond strength of the ink to the ink-receiver layer.

However, studies by the present inventors revealed that, even though a bar code-printed sheet having a porous layer made of the above ultra-high-molecular-weight polyethylene as an ink-receiver layer and having an average surface roughness Ra of 5 $\mu$m or less was used, bar codes could not be successfully read with a bar code reader at a ratio of 100% in many cases after repeatedly washing (70° C., 30 min) 100 times.

To clarify the reason therefor, the present inventors conducted further studies and, as a result, found out that the above-mentioned trouble was caused by the heat shrinkability of the ink-receiver layer.

The above-mentioned porous ink-receiver layer made of an ultra-high-molecular-weight polyethylene is produced by cutting a porous sintered product of the ultra-high-molecular-weight polyethylene powder into films or stretching an extrusion-molded ultra-high-molecular-weight polyethylene sheet. During the production process, the ultra-high-molecular-weight polyethylene molecular chains are solidified and immobilized in a forcibly extended state, which makes it unavoidable to make the ink-receiver layer thermally shrinkable. The maximum thermal stress f based on this heat shrinkability is expressed in the formula:

$$f=ke$$

wherein k means the degree of heat shrinkage, while e represents Young's modulus. Even though the ultra-high-molecular-weight polyethylene has a high Young's modulus, the porous structure has a considerably lowered Young's modulus. As a result, the above-mentioned thermal stress ke is lowered too.

In spite of such a low thermal stress, the dependency upon the heat shrinkability, which was revealed by the above studies, might be brought about by the fact that stress cracking in the ultra-high-molecular-weight polyethylene is accelerated by the contact with surfactants, alkalis, and solvents having high temperature (about 70° C.) during frequent washing and thus the porous tissue of the ultra-high-molecular-weight polyethylene is broken.

SUMMARY OF THE INVENTION

An object of the present invention is to make it possible that, when a bar code-printed sheet is stuck onto fabric articles such as uniforms and the fabric articles are repeatedly rented to supply and washed under the management with the use of the bar codes, the bar codes can be successfully read at a ratio of 100% even after repeatedly washing 100 times, thus ensuring smooth rental business.

The method of renting fabric articles according to the present invention, which comprises sticking a data code-printed sheet onto the fabric articles and repeatedly renting and washing the fabric articles under the management with the use of the data code, the data code-printed sheet being one in which the data code is printed on an ink-receiver layer which is a porous layer made of an ultra-high-molecular-weight polyethylene having a viscosity-average molecular weight of from 500,000 to 10,000,000 and which has an average surface roughness Ra of 5 $\mu$m or less and a degree of shrinkage of 5% or less under contact with air or in an aqueous alkali solution of pH 10 to 11.

BRIEF DESCRIPTION OF THE DRAWING

FIGURE is a drawing which illustrates an example of the bar code-printed sheet to be used in the present invention, wherein numeral reference 1 indicates an ink-receiver layer; numeral reference 2 indicates a bar code; numeral reference 3 indicates a support; and numeral reference 4 indicates an adhesive layer.

DETAILED DESCRIPTION OF THE INVENTION

Examples of the fabric articles to be rented to supply in the present invention include uniforms such as work clothes, sheets and bedclothes to be used in hotels and hospitals and table clothes to be used in hotels and restaurants.

Although these fabric articles may be washed in laundries with the use of water and detergents, it is preferable to dry-clean them by using petroleum hydrocarbons, hydrocarbon chlorides, etc. In dry-cleaning, water-soluble stains can be also eliminated by using detergents containing anionic or nonionic surfactants as the major component while controlling the solvent concentration.

When washing in water, alkaline substances such as sodium carbonate are employed and thus free fatty acids in oily stains, etc. are saponified and solubilized thereby, while carbohydrate stains such as starch are swelled and thus liberated from the fabric articles into water.

To rent fabric articles by the method in accordance with the present invention, a bar code-printed sheet, wherein a bar code is printed on an ink-receiver layer which is a porous layer made of an ultra-high-molecular-weight polyethylene having a viscosity-average molecular weight of from 500,000 to 10,000,000 and having an average surface roughness Ra of 5 $\mu$m or less and a degree of shrinkage under contact with air or in an aqueous alkali solution of pH 10 to 11 of 5% or less, is stuck onto the fabric articles which are then repeatedly rented and washed under the management with the use of the bar codes.

The average surface roughness as used herein, Ra can be measured using a feeler having a tip having a radius of 250 $\mu$m according to JIS B $0601_{-1994}$.

FIGURE shows an example of the bar code-printed sheet to be used in the present invention.

In FIG., 1 represents an ink-receiver layer which is a porous layer made of an ultra-high-molecular-weight polyethylene having a viscosity-average molecular weight of from 500,000 to 10,000,000 and having an average surface roughness Ra (determined by a feeler type surface roughness meter (radius of the feeler tip: 250 $\mu$m, cut-off: 0.8 mm, and running rate: 0.3 mm/sec) which calculates the average vertical displacement of the feeler according to JIS B $0601_{-1994}$) of 5 $\mu$m or less and a usual degree of shrinkage under contact with air or a degree of shrinkage in an aqueous alkali solution of pH 10 to 11 of 5% or less.

2 represents a bar code the ink of which has been penetrated into the porous layer 1 and held therein.

3 represents a light-impermeable layer such as a white layer serving as a support, while 4 represents an adhesive layer formed on the back face of the support 3.

The above-mentioned ink-receiver layer can be obtained by stretching an ultra-high-molecular-weight polyethylene sheet, cutting a porous sintered product (average particle size $\leqq$100 $\mu$m) of an ultra-high-molecular-weight polyethylene powder into films, eliminating fine particles by elution, etc. from an ultra-high-molecular-weight polyethylene film or coating layer having fine particles dispersed therein, fusing an ultra-high-molecular-weight polyethylene powder under heating (Japanese Patent No. 2020026), etc. The ink-receiver layer may be either formed directly on the support by coating, etc. or separately formed and then laminated on the support, depending on the method for forming the ink-receiver layer.

This ink-receiver layer usually has a porous (open-cell) structure with a porosity of usually from 10 to 80%, preferably from 20 to 70%. (When the porosity is lower than 10%, the ink-receiver layer can be hardly impregnated with the ink. When the porosity exceeds 80%, on the other hand, the ink-receiver layer has a poor mechanical strength.)

The thickness of the ink-receiver layer ranges usually from 10 to 500 $\mu$m, preferably from 20 to 300 $\mu$m and still preferably from 30 to 200 $\mu$m. (When its thickness is less than 10 $\mu$m, it is impregnated with the ink only at an insufficient depth and thus the ink cannot be sufficiently held therein. When the thickness exceeds 500 $\mu$m, there frequently arises intralayer breakage due to shearing.)

To elevate the ink-permeability, the above-mentioned ink-receiver layer may be subjected to corona discharge treatment, plasma treatment or chemical etching. Moreover, it may be crosslinked by electron irradiation so as to improve the heat resistance.

The ink-receiver layer may contain colorants and antioxidants. Usually, colorants are added in an amount of 30 parts by weight or less per 100 parts by weight of the ultra-high-molecular-weight polyethylene, while antioxidants are added in an amount of 10 parts by weight or less per 100 parts by weight of the ultra-high-molecular-weight polyethylene. As the colorants, use may be made of those having a high contrast with the one contained in the ink. Namely, the colorants may be selected depending on those to be used in the ink as will be cited hereinafter. On the other hand, examples of the antioxidants usable herein include aromatic amines, sulfur compounds, phosphorus compounds, hydrazines and oxamides.

To elevate the contrast of the ink-receiver layer with the bar code, coloring pigments (white pigments) may be added to the ink-receiver layer. It is also possible to form a white light-impermeable layer (for example, paper, nonwoven fabric, resin film, metal sheet or metal net) within the ink-receiver layer. Examples of the paper usable therefor include natural papers such as woodfree paper, art paper and coat paper and synthetic papers such as polypropylene. Examples of the resin film include those made of cellulose resins (ethylene cellulose, cellulose acetate, etc.), olefin resins (polyethylene of other type, polypropylene, ethylene/vinyl acetate copolymer, etc.), vinyl resins (polystyrene, polyvinyl chloride, etc.), polyester resins (polyethylene terephthalate, polystyrene terephthalate, etc.), polyurethane resins, polyamide resins, xylene resins, polyvinylidene chloride resins, polycarbonate acrylic resins and polyarylates. Moreover, use may be made, as the above-mentioned resin, of heat resistant resins (polyimide, polyether ether ketone, polyether sulfone, polyether imide, polysulfone, polyphenylene sulfide, polyamidoimide, aromatic polyamide, poly-para-benzoic acid, silicone resins, fluorocarbon resins, epoxy resins, etc.) and UV-hardened resins (epoxyacrylic resin, urethane acrylic resin, polyester acrylic resin, acrylate resin, alkyd acrylic resin, silicone acrylic resin, polyethylene/polyol resin, aminoalkyd resin, etc.).

The bar code may be printed by the heat transfer printing system or the ink-jet printing system. As the ink, use can be made of one prepared by kneading one or more colorants with a polyolefin by using a kneader such as a roll mill or pot mill. The fluidity of the ink may be appropriately controlled with the use of a solvent. As the polyolefin, use may be made of, for example, polyethylene or polypropylene having a viscosity-average molecular weight of 500 to 300,000, preferably from 1,000 to 10,000. As the colorants, either inorganic colorants or organic colorants may be employed. Examples of the inorganic colorants include black colorants (carbon, etc.), white colorants (silica, titania, alumina, zinc white, zirconia, calcium oxide, calcium carbonate, mica, etc.), red colorants (manganese oxide/alumina, chromium oxide/tin oxide, iron oxide, cadmium sulfide/selenium sulfide, etc.), blue colorants (cobalt oxide, zirconia/vanadium oxide, chromium oxide/divanadium pentaoxide, etc.), black colorants (chromium oxide/cobalt oxide/iron oxide/manganese oxide, chromates, permanganates, etc.), yellow colorants (girconium/silicon/praseodymium, vanadium/tin, chromium/titanium/antimony, etc.), green colorants (chromium oxide, cobalt/chromium, alumina/chromium, etc.) and pink colorants (aluminum/manganese, iron/silicon/girconium, etc.).

Examples of the organic colorants include azo pigments, phthalocyanine pigments, triphenylmethane pigments, vat pigments, quinacridone pigments and isoindonoline pigments. Usually, these pigments are added in an amount of 50 to 500 parts by weight, preferably 100 to 300 parts by weight, per 100 parts by weight of the polyolefin.

As the print ribbon in the above-mentioned heat transfer printing system, use may be made of those produced by coating or impregnating a support (for example, a film made of polyester, polyimide or fluorocarbon resin or fabric) with an ink (coating thickness ranging usually from 0.2 to 5 $\mu$m, preferably from 0.8 to 1.5 $\mu$m). To improve the adhesion of the ink layer, it is preferable to use a support having an undercoating (for example, fabric coated with wax).

Instead of the heat transfer printing system, it is possible to use other methods such as the ink jet system. It is further possible in some printing systems to promote the penetration of the ink into the porous ink-receiver layer by heating and pressurizing after patterning by means of a heated roller etc.

As the data codes to be printed onto the ink-receiver layer, bar codes are employed in general. However, it is possible to use dot codes therefor.

As the adhesive layer 4 shown in Figure, a pressure-sensitive adhesive may be employed. However, it is preferable to use a hot melt adhesive therefor. Examples of the hot melt adhesive include ethylene/vinyl acetate-based adhesives, polyolefin-based adhesives, polyamide-based adhesives, styrene-based adhesives, elastomer-based adhesives, polyester-based adhesives and polyurethane-based adhesives. The thickness of the adhesive layer usually ranges from 1 to 500 $\mu$m.

The method of renting and supplying fabric articles such as uniforms of the present invention comprises sticking the above-mentioned bar code-printed sheet onto the fabric article by pressing with an iron etc. utilizing the adhesive layer, renting and supplying the fabric articles to factories or hospitals, after the use of a definite period of time, collecting the fabric articles and then washing. In this washing step, stains are eliminated from the fabric articles owing to the functions of detergents such as penetration (penetration of detergent solution between fibers and stains), adsorption (adsorption of lipophilic groups in detergent molecules onto dirt and oily stains), swelling (swelling of dirt and oily stains due to the thus adsorbed detergent molecules followed by liberation from fibers), dispersion (dispersion of the liberated dirt followed by mechanical cutting and encapsulation of the dirt pieces thus cut in detergent molecules, thus preventing re-adhesion) and emulsification (further dispersion, i.e., cutting the dirt pieces into smaller ones and complete encapsulation thereof) and effects of the mechanical flow of the washing liquor. It is also possible that free fatty acids in oily stains, etc. are saponified and solubilized by using alkaline materials while carbohydrate stains such as starch are swelled by using the soaps and thus liberated from the fabric articles into water.

After washing, the fabric articles are rented again. Subsequently, the steps of collection, washing and renting are repeated.

In the present invention, use is made, as the bar code-printed sheet, one wherein a bar code is printed on an ink-receiver layer which is a porous layer made of an ultra-high-molecular-weight polyethylene having a viscosity-average molecular weight of from 500,000 to 10,000,000 and having an average surface roughness Ra of 5 $\mu$m or less and a degree of shrinkage of 5% or less. As will be shown by the Examples given hereinbelow, the bar codes can be read even after washing 100 times in a washing machine for business use. Supposing that the fabric articles are washed once a week, they can be smoothly managed depending on the bar codes for about two years.

It is effective to lower the average surface roughness Ra of the porous ink-receiver layer for strengthening the binding of the ink to the ink-receiver layer and sustaining a high sensitivity in reading bar code. This is because the ink-contact area of the ink-receiver layer per unit area can be thus enlarged and heat can be more uniformly transferred thereto from the heat transfer printing head.

As a comparison of the following Examples and Comparative Examples shows, bar codes cannot be satisfactorily read when the degree of shrinkage of the ink-receiver layer exceeds 5%, even though the average surface roughness thereof is low (5 $\mu$m or less). The reason for this phenomenon is estimated as follows. Although the heat stress occurring under heating during washing (about 70° C.) or pressing for sticking is negligibly low, stress cracking in the ultra-high-molecular-weight polyethylene proceeds when the ink-receiver layer is in contact with surfactants or alkalis. As a result, the bond interface between the ink-receiver layer and ink is broken and the printed bar code indication becomes unclear.

The degree of shrinkage ξ is expressed by the following formula:

$$\xi=(L-L_o)\times100/L$$

wherein $L_o$ means the size at the point when shrinkage does not proceed any more at a definite temperature, and L means the initial size L. When the heating temperature is 130° C., the size after heating for 30 minutes is referred to as $L_o$.

The condition "a degree of shrinkage in an aqueous alkali solution of pH 10 to 11 of 5% or less" indicates the washing conditions (i.e., pH 10 to 11, 100° C. or below) with the use of the above-mentioned alkalis. More specifically, the washing with the use of the alkalis is effected at a temperature of from 0 to 100° C for about one hour.

EXAMPLES

The bar code-printed sheets employed in Examples and Comparative Examples are as follows. The degree of shrinkage as measured herein means one measured at a heating temperature of 130° C. under contact with air as described above.

Example 1

A powder (average particle size: 30 $\mu$m) of an ultra-high-molecular-weight polyethylene (m.p.: 135° C.) having a viecosity-average molecular weight of about 3,500,000 was packed into a mold and sintered by heating at 160° C. (pressure: 1,000 g/cm$^2$) to thereby give a porous rod with open-cell structure. After cooling, it was cut with a lathe running machine to give a porous ultra-high-molecular-weight polyethylene film having an average surface roughness of 1 $\mu$m, a degree of shrinkage of 1%, an average pore size of 20 $\mu$m, a porosity of 25% and a thickness of 100 $\mu$m. This film was laminated onto a white ultra-high-molecular-weight polyethylene film (non-porous, degree of shrinkage: 2%) having a thickness of 40 $\mu$m.

Next, a bar code was printed onto the ink-receiver layer (i.e., the porous ultra-high-molecular-weight polyethylene film) of this laminate sheet by using a marketed heat transfer printer and an ink sheet which had been prepared by blending 100 parts by weight of polyethylene having a viscosity-average molecular weight of about 8,000 with 100 parts by weight of carbon powder at about 200° C. and applying the ink thus obtained onto a polyester film of 6 μm in thickness with a gravure coating machine to provide a coat having a thickness of 0.6 μm, thus forming a bar code-printed sheet.

Example 2

The procedure of Example 1 was repeated except for altering the sintering condition (i.e., the pressure was changed to 0 g/cm$^2$) and using the resulting porous ultra-high-molecular-weight polyethylene film having an average surface roughness of 2 μm, a degree of shrinkage of 1.5%, an average pore size of 30 μm, a porosity of 35% and a thickness of 100 μm.

Example 3

The procedure of Example 1 was repeated except for altering the sintering condition (i.e., the pressure was changed to 5,000 g/cm$^2$) and using the resulting porous ultra-high-molecular-weight polyethylene film having an average surface roughness of 0.5 μm, a degree of shrinkage of 1%, an average pore size of 20 μm, a porosity of 5% and a thickness of 100 μm.

Example 4

The procedure of Example 1 was repeated except for using a powder (average particle size: 160 μm) of an ultra-high-molecular-weight polyethylene in combination with the powder (average particle size: 30 μm) of an ultra-high-molecular-weight polyethylene and using the resulting porous ultra-high-molecular-weight polyethylene film having an average surface roughness of 5 μm, a degree of shrinkage of 1.5%, an average pore size of 60 μm, a porosity of 35% and a thickness of 100 μm.

Each of these bar code-printed sheets was stuck onto 10 uniforms made of a blended yarn fabric (cotton/polyester =1/1) at 190° C. for 10 seconds. Then, the fabric articles were washed (70° C., 30 minutes) in a washing machine for business use 10, 30, 50 and 100 times and the bar code reading ratio was determined by using a bar code reader. As a result, the bar codes could be read at a ratio of 100% even after washing 100 times, as shown in Table 1. Thus, it is proved that rental fabric articles can be smoothly managed with the use of bar codes over a long period of time.

TABLE 1

| No. of washing operation | 10 | 30 | 50 | 100 |
|---|---|---|---|---|
| Example 1 | 100% | 100% | 100% | 100% |
| Example 2 | 100% | 100% | 100% | 100% |
| Example 3 | 100% | 100% | 100% | 100% |
| Example 4 | 100% | 100% | 100% | 100% |
| Comparative Example 1 | 100% | 70% | 20% | 0% |
| Comparative Example 2 | 100% | 50% | 10% | 0% |
| Example 5 | 100% | 100% | 100% | 100% |

Comparative Example 1

The procedure of Example 1 was repeated except for altering the sintering condition and using the resulting porous ultra-high-molecular-weight polyethylene film having an average surface roughness of 1 μm, a degree of shrinkage of 6%, an average pore size of 30 μm, a porosity of 35% and a thickness of 100 μm.

Comparative Example 2

The procedure of Example 1 was repeated except for altering the sintering condition and using the resulting porous ultra-high-molecular-weight polyethylene film having an average surface roughness of 7 μm, a degree of shrinkage of 1.5%, an average pore size of 30 μm, a porosity of 35% and a thickness of 100 μm.

These bar code-printed sheets were also subjected to the washing treatment in the same manner as the one described above and the bar code reading ratio was determined. Table 1 shows the results.

In Comparative Example 1, the bar code could be read only at a ratio of 20% or less after washing 50 times, since the porous ultra-high-molecular-weight polyethylene film had a degree of shrinkage exceeding 5%, though its average surface roughness was as low as 1 μm. In Comparative Example 2, on the other hand, the bar code could be read only at a ratio of 50% or less after washing 30 times, since the porous ultra-high-molecular-weight polyethylene film had a large average surface roughness of 7 μm, though its degree of shrinkage was as low as 1.5%. Namely, no reliable management with the use of bar codes can be established in these cases.

Example 5

A bar code-printed sheet was produced by repeating the procedure of Example 1 except for using, as the ink-receiver layer, a porous ultra-high-molecular-weight polyethylene film having an average surface roughness of 0.8 μm, a degree of shrinkage of 2.5%, an average pore size of 10 to 90 μm, a porosity of 20% and a thickness of 100 μm, which was obtained by stretching an ultra-high-molecular-weight polyethylene film of a viscosity-average molecular weight of 2,000,000.

This bar code-printed sheet was also subjected to the washing treatment in the same manner as those of Examples 1 to 4 and the bar code reading ratio was determined. Table 1 shows the results. Thus it was found out that, when an ink-receiver layer obtained by stretching an ultra-high-molecular-weight polyethylene film was employed, bar codes could be read at a ratio of 100% even after washing 100 times, similar to the cases where porous ultra-high-molecular-weight polyethylene films obtained by the sintering method (Examples 1 to 4) were used.

According to the present invention, when bar code-printed sheets are stuck onto fabric articles which are then repeatedly rented and washed under the management with the use of the bar codes, the bar codes can be read at a ratio of 100% even after repeatedly washing the fabric articles 100 times and thus the rental business can be smoothly performed.

While the invention has been described in detail and with reference to specific embodiments thereof, it will be apparent to one skilled in the art that various changes and modifications can be made therein without departing from the spirit and scope thereof.

What is claimed is:

1. A method of renting a fabric article comprising sticking a data code-printed sheet onto the article and repeatedly renting and washing the article, using the data code for tracking the article, said data code-printed sheet comprising the data code printed on a porous ink-receiver layer comprising an ultra-high-molecular-weight polyethylene having a viscosity-average molecular weight of from 500,000 to 10,000,000 and which has an average surface roughness Ra of 5 μm or less and a degree of shrinkage of 5% or less.

2. A data code-printed sheet, comprising a data code printed on a porous ink-receiver layer comprising an ultra-high-molecular-weight polyethylene having a viscosity-average molecular weight of from 500,000 to 10,000,000 and which has an average surface roughness Ra of 5 μm or less and a degree of shrinkage of 5% or less.

3. A method of renting fabric articles comprising sticking a data code-printed sheet onto the fabric articles and repeatedly renting and washing the fabric articles using the data code for tracking the articles, said data code-printed sheet comprising the data code printed on a porous ink-receiver layer comprising an ultra-high-molecular-weight polyethylene having a viscosity-average molecular weight of from 500,000 to 10,000,000 and which has an average surface roughness Ra of 5 μm or less and a degree of shrinkage in an aqueous alkali solution of pH 10 to 11 of 5% or less.

4. A data code-printed sheet, comprising a data code printed on a porous ink-receiver layer comprising an ultra-high-molecular-weight polyethylene having a viscosity-average molecular weight of from 500,000 to 10,000,000 and which has an average surface roughness Ra of 5 μm or less and a degree of shrinkage in an aqueous alkali solution to pH 10 to 11 of 5% or less.

* * * * *